United States Patent Office 3,078,648
Patented Feb. 26, 1963

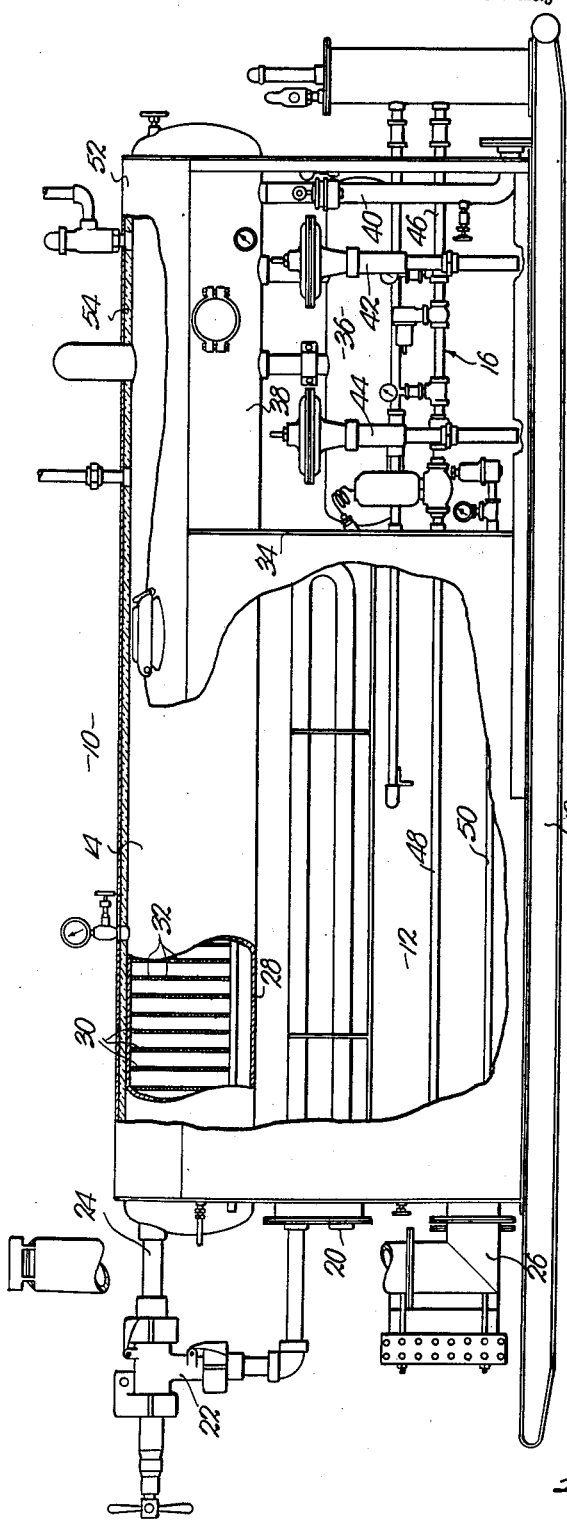

3,078,648
WELL HEAD GAS PRODUCTION UNIT
Jerry M. Edmondson, Emporia, Kans., assignor to Sauder Tank Company, Inc., Emporia, Kans., a corporation of Kansas
Filed May 10, 1960, Ser. No. 28,090
3 Claims. (Cl. 55—202)

The present invention relates to well head gas production units and more particularly to a well head gas production unit wherein the location of the elements of the unit are arranged to take maximum advantage of the heat produced by the element to prevent freezing in the various components and to increase the speed of separation of the products taken from the well.

The present invention proposes to provide a well head gas production unit wherein the water tank, the separator and the control area are closely arranged so that the heat of the water in the water tank may be used to speed up the separating process in the separating tank and to heat the area of the control means to prevent the same from freezing when the low temperatures of the winter season are present.

It is therefore the most important object of the present invention to arrange the water tank separator and control area of a well head gas production unit in extremely close proximity, enabling the heat from the water tank to speed the separation in the separating tank and to heat the control area against freezing.

It is another object of the present invention to provide in structure closely organized as above set forth a common wall between the tank and separator and between the tank and control area and, further, between the separator and the control area whereby the heat transfer between the three elements of the production unit enables the heat from the water tank to speed the separation in the separating tank and to heat the control area in cooperation with the heat from the separator to prevent the same from freezing under low temperature conditions.

It is a further object of the present invention to provide structure as above set forth wherein an insulated shroud is provided encompassing the tank, control area and controls, and all or a portion of the separating tank whereby the heat of the units as above set forth is prevented from rapidly dissipating, thereby accumulating within the shroud to additionally help to speed up the separating process and prevent freezing of the elements of the unit.

It is a further object of the present invention to provide structure as above set forth wherein the separating tank is additionally provided with baffles transverse to the inflow of well products, the baffles further assisting in preventing freezing, particularly in the separating tank.

Further objects and advantages inherent in the structure of the present invention will become obvious as this specification proceeds and the same are intended to be covered by the scope of the appended claims.

In the drawings:

FIGURE 1 is a side elevational view of the structure embodying the present invention with portions broken away to show details of construction; and FIG. 2 is a top plan view of the present invention with portions broken away to show details of construction.

Referring now to the drawings, a well head gas production unit generally indicated by the numeral 10 is shown including a water tank 12, a separator 14 and control means generally indicated by the numeral 16. The unit 10 is mounted upon a skid 18 or other form of base as may be desirable. Well stream inflow means are shown in the form of a conduit 20 which is connected to the outlet of a well (not shown) and extends in a plurality of loops through the longitudinal length of tank 12, exiting from the tank 12 immediately above its point of entrance. The conduit 20 terminates in a pressure drop structure 22. A pipe 24 communicates between pressure drop structure 22 and separator 14. It can therefore be seen that products from the well will pass into conduit 20 and through the water tank 12, pressure drop structure 22 and pipe 24 to separator 14. A furnace 26 is shown extending into water tank 12 which is filled with water for the purpose of heating the water to a desired temperature. It can therefore be further seen that the well products in conduit 20 will be heated by the water in tank 12, the heat causing separation to take place in tank 14 in a much shorter time than would be the case if they entered separator 14 at the normal temperatures they have when leaving the well.

It should be further noted that the top wall of tank 12 is formed by a portion of the cylindrical surface of separator 14, a portion of which is designated by the numeral 28. Therefore, tank 12 and separator 14 have at least one common wall. The common wall portion 28, by virtue of the cylindrical shape of separator 14, is immersed in the heated water of tank 12 and heat is conducted through the wall 28 into the separator which additionally helps to speed up the separating process.

A plurality of baffles 30 are provided in separator 14 adjacent the zone of coupling of pipe 24 and tank 14, each of the baffles 30 being provided with a plurality of apertures 32 through which the incoming fluid must flow. The provision of the baffles 30, which are transverse to the line of inflow of material into separator 14, is an aid to the heat from tank 12 in preventing the freezing of the contents of separator 14.

While the well products, which normally would be oil, gas and water, remain in tank 14 they are caused to separate out into levels of gas, oil and water. It will be noted from the drawings and construction described that separator 14 is supported above the water tank 12 and is longer than the tank 12 so that portions of the separator 14 extend or project beyond the ends of tank 12. The outlet end of separator 14 extends considerably beyond the end 34 of tank 12, which is the right end in the drawing, so that a control area 36 is formed to the side of tank 12 and below separator 14. The end wall 34 and the portion of separator 14 which extends or projects therebeyond and which is designated in the drawings by the number 38 provide defining surfaces for control area 36. Heat conductive walls of tank 12 and separator 14 allow heat to be transferred from tank 12 and separator 14 into control area 36 to heat the control area 36 and prevent freezing which otherwise might occur due to weather conditions.

It should be noted at this point that the operation of water tank 12 and separator 14 and controls 16 is well known in the art and the same will not be further described in this application except to indicate that control means 36 includes a gas outlet 40, an oil outlet 42 and a water outlet 44 coupled with separator 14 for draining off the various products which have been separated in the separator 14 and carrying them to conduits (not shown) for transferring the products to other locations. As these units have particular use with gas or oil wells, either outlets 40 or 42 or both may be connected to pipeline systems for transferring these products to a point of storage or use after being processed by unit 10. It should be further noted that a gas bleeding conduit is provided for bringing gas into tank 12 and is designated by the numeral 46. Conduit 46, after travel through the control area, terminates in a first preheat coil 48 and a second preheat coil 50. The operation of such structure is also well known and is described for the purpose of indicating that the fuel for furnace 26 may be bled off of the gas outlet line 40 so that the unit separates out the gas which is used as fuel for furnace 26.

The remainder of the control area 36 is defined by a shroud 52 which extends completely over the entire well head production unit 10 encompassing tank 12, separator 14 and control area 36. The ends of the separator tank 14 protrude from shroud 52 as do certain pipes and controls which must be viewable from the exterior of the unit. Shroud 52 is provided with insulation as indicated at 54 for retaining the heat of the unit within the confines of shroud 52. Such being the case, it can be seen that the heat produced by the tank 12 and the heat present in the separator 14 will be conducted through wall 34 and through surface portion 38 of tank 14 into controls area 36, warming the controls area against freezing due to the outside weather conditions. It will further be seen that by virtue of the provision of shroud 52 the entire compact construction of the unit is shrouded and insulated against the rapid dissipation of heat therefrom which would normally occur due to the heat conductivity of the metal from which the units are normally constructed. Such insulation 54 insures that there will be a sufficient heat build-up in the shroud so that all of the parts of the unit will be heated and so that the maximum use of the heat produced by the unit may be made in preventing freeze-ups of the control and in speeding up the separating action in the separator tank. The last-named function is important by reason of the fact that the separating of the various products of the well in the separator is the most time-consuming of the operations of the unit.

Having thus described the invention what is claimed as new and desired to be secured by Letters Patent is:

1. In a well head gas production unit, a water tank having a pair of side walls, a pair of end walls, and a bottom wall; means for heating the water in the tank; a separator disposed above said tank, a portion of the wall of the separator forming the top wall of the water tank; means for immersing said top wall in the water in the tank; and a control area at one end of said water tank and having an outer end wall, a bottom wall, and an inner end wall, said inner end wall being common with one of the end walls of said tank and a part of said separator extending through said common wall in overlying relationship to said control area, said part of the separator having a normally lower portion which is a continuation of that portion of the separator forming the top wall of the water tank whereby the heat from said tank is conducted into said control area through said common wall and by said portion of said part of the separator.

2. In a well head gas production unit, a water tank having a pair of side walls, a pair of end walls and a bottom wall; means for heating the water in the tank; a cylindrical separator positioned above said water tank, an arcuate portion of the wall of the separator forming the top wall of the water tank, means for immersing said top wall in the water in the tank, a control area having an outer end wall, a bottom wall, a top wall formed by an arcuate portion of the wall of said separator and an inner end wall, said inner end wall being formed by one of the end walls of said water tank; well stream inflow means extending through said water tank and coupled with said separator for directing a flow of well products through said water tank to said separator; a plurality of perforated baffles mounted within said separator transversely thereof in the path of flow of substantially all of the well products in the separator; means for immersing a portion of each of said baffles in the liquid well products present in the separator during operation of the unit; and an insulated shroud enclosing said separator, water tank and the sides of the control area whereby to retain the heat generated by said unit within said shroud, the heat from the water tank being conducted through the top wall thereof into said separator and from the water tank through said one end wall thereof into the control area.

3. In a well head gas production unit, a water tank having a pair of side walls, a pair of end walls and a bottom wall; means for heating the water in the tank; a cylindrical separator positioned above said water tank, an arcuate portion of the wall of the separator forming the top wall of the water tank, means for immersing said top wall in the water in the tank; a control area having an outer end wall, a bottom wall, a top wall formed by an arcuate portion of the wall of said separator and an inner end wall, said inner end wall being formed by one of the end walls of said water tank; well stream inflow means extending through said water tank and coupled with said separator for directing a flow of well products through said water tank to said separator; a plurality of perforated baffles mounted within said separator transversely thereof in the path of flow of substantially all of the well products in the separator; and means for immersing a portion of each of said baffles in the liquid well products present in the separator during operation of the unit.

References Cited in the file of this patent
UNITED STATES PATENTS

| | | |
|---|---|---|
| 2,614,649 | Walker et al. | Oct. 21, 1952 |
| 2,619,187 | Hayes et al. | Nov. 25, 1952 |
| 2,911,058 | Lavery | Nov. 3, 1959 |